United States Patent
Fewless et al.

(10) Patent No.: US 11,054,547 B2
(45) Date of Patent: *Jul. 6, 2021

(54) PEDESTRIAN WIND ENVIRONMENT DISPLAY SYSTEM

(71) Applicant: CPP Incorporated, Fort Collins, CO (US)

(72) Inventors: Yarrow Jacob Fewless, Fort Collins, CO (US); Kevin Devaughn Ott, Fort Collins, CO (US); Scott Matthew Parrish, Fort Collins, CO (US)

(73) Assignee: CPP Incorporated, Fort Collins, CO (US)

( * ) Notice: Subject to any disclaimer, the term of this patent is extended or adjusted under 35 U.S.C. 154(b) by 493 days.

This patent is subject to a terminal disclaimer.

(21) Appl. No.: 15/916,593

(22) Filed: Mar. 9, 2018

(65) Prior Publication Data

US 2019/0278002 A1 Sep. 12, 2019

(51) Int. Cl.
*G01W 1/10* (2006.01)
*G06F 3/0484* (2013.01)
*G06F 3/0481* (2013.01)

(52) U.S. Cl.
CPC ............ *G01W 1/10* (2013.01); *G06F 3/04815* (2013.01); *G06F 3/04842* (2013.01)

(58) Field of Classification Search
CPC ... G01W 1/10; G06F 3/04842; G06F 3/04815
See application file for complete search history.

(56) References Cited

U.S. PATENT DOCUMENTS

| 8,730,319 | B2 * | 5/2014 | Sekine | G06T 19/006 348/115 |
| 9,437,170 | B1 * | 9/2016 | Quevedo Montesdeoca | G06F 3/147 |
| 9,714,089 | B1 | 7/2017 | Louw et al. | |

(Continued)

FOREIGN PATENT DOCUMENTS

| JP | 2002049298 | 2/2002 |
| JP | 5685499 | 3/2015 |

OTHER PUBLICATIONS

Du et al. "New criteria for assessing low wind environment at pedestrian level in Hong Kong". Building and Environment 123 (2017). pp. 23-36. (Year: 2017).*

(Continued)

*Primary Examiner* — Eunhee Kim
(74) *Attorney, Agent, or Firm* — Craig R. Miles; CR Miles P.C.

(57) ABSTRACT

Generally, a pedestrian wind environment analysis and display system operable to support one or more client computing devices. Specifically, a browser based graphical user interface which depicts a graphical representation of a spatially referenced three-dimensional model space including a plurality of wind velocity indicators each associated with wind velocity values derived from wind velocity data measured at corresponding location coordinates in the spatially referenced three dimensional model space, each of plurality of wind velocity indicators can be selected in the graphical user interface to cause depiction of a wind velocity graph which plots the associated measured wind velocity values as wind direction and wind speed to characterize a pedestrian wind environment.

15 Claims, 7 Drawing Sheets

(56) References Cited

U.S. PATENT DOCUMENTS

| | | | |
|---|---|---|---|
| 2010/0265125 A1* | 10/2010 | Kelly | G01S 7/04 |
| | | | 342/179 |
| 2015/0042479 A1 | 2/2015 | Muetzel et al. | |
| 2015/0142393 A1 | 5/2015 | van den Berghe | |
| 2019/0101934 A1* | 4/2019 | Tuukkanen | G05D 1/101 |

OTHER PUBLICATIONS

PCT International Patent Application No. PCT/US19/13862; International Search Report and Written Opinion of the International Searching Authority dated Apr. 9, 2019, 15 pages.
U.S. Appl. No. 16/041,592, filed Jul. 20, 2018.
PCT International Patent Application No. PCT/US18/43768; International Search Report and Written Opinion of the International Searching Authority dated Oct. 3, 2018, 9 pages.
Banks et al. Practical issues for pedestrian wind comfort prediction: surface-level wind speed sensors. CPP Wind Engineering and Air Quality Consultant, 2006, Fort Collins, Colorado.
Banks et al. Practical issues for pedestrian wind comfort prediction: surface-level wind speed sensors. Feb. 2006, 12th Australian Wind Engineering Society Workshop, Queenstown, New Zealand, 4 pages.
Banks et al. Practical issues for pedestrian wind comfort prediction: comfort criteria. Feb. 2006, 12th Australian Wind Engineering Society Workshop, Queenstown, New Zealand, 4 pages.
U.S. Appl. No. 17/144,251, filed Jan. 8, 2021.

* cited by examiner

PEDESTRIAN WIND ENVIRONMENT DISPLAY SYSTEM

FIELD OF THE INVENTION

Generally, an environmental analysis and display system operable to support one or more client computing devices. Specifically, a browser based graphical user interface which depicts a graphical representation of a spatially referenced three-dimensional model space including a plurality of graphical indicators each associated with predicted environmental values derived from actual or simulated interactions of fluid flows at a plurality of location coordinates within a spatially referenced three-dimensional model space, each of plurality of graphical indicators selectable in the graphical user interface to cause depiction of one or more graphs which plot the relative occurrence of the predicted environmental values for a given combined probability to characterize a pedestrian wind or thermal environment.

SUMMARY OF THE INVENTION

A broad object of particular embodiments of the invention can be to provide a computer implemented system including a processor communicatively coupled to a non-transitory computer readable media containing a computer program executable to process actual or simulated interactions of fluid flows at a plurality of location coordinates within a spatially referenced three-dimensional model space into predicted environmental values and render the spatially referenced three-dimensional model space as a graphical user interface compatible with a web browser of one or more client computing devices to depict a graphical representation of the spatially referenced three-dimensional model space including a plurality of graphical indicators each depicted in the graphical representation corresponding to location coordinates in the spatially referenced three dimensional model space and each of the plurality of graphical indicators in the graphical representation correspondingly associated with the predicted environmental values at the location coordinates within spatially referenced three dimensional model space and a server computer which upon request from a client computing device serves the graphical user interface compatible with the web browser of the client computing device.

Another broad object of embodiment of the invention can be to provide a client computing device including a browser adapted to communicatively couple by a network to a server computer, the client computing device including a processor communicatively coupled to a non-transitory computer readable media containing a computer program executable to download a graphical user interface from the server computer and depict on a display surface of the client computing device a graphical representation of a spatially referenced three-dimensional model space including a plurality of graphical indicators each associated with predicted environmental values at corresponding location coordinates within the spatially referenced three-dimensional model space, wherein each one of the plurality of graphical indicators can be selected by user command to cause depiction of one or more graphs which plot the relative occurrence of the predicted environmental values for a given combined probability to characterize a pedestrian wind or thermal environment.

Another broad object of particular embodiments of the invention can be to provide a graphical user interface which depicts on a display surface of a computing device a graphical representation of a spatially referenced three-dimensional model space including a plurality of graphical indicators each associated with predicted environmental values at corresponding location coordinates within the spatially referenced three-dimensional model space, wherein each one of the plurality of graphical indicators can be selected by user command to cause depiction of one or more graphs which plot the relative occurrence of the predicted environmental values for a given combined probability to characterize a pedestrian wind or thermal environment.

Naturally, further objects of the invention are disclosed throughout other areas of the specification, drawings, photographs, and claims.

DETAILED DESCRIPTION OF THE INVENTION

Figure 1:
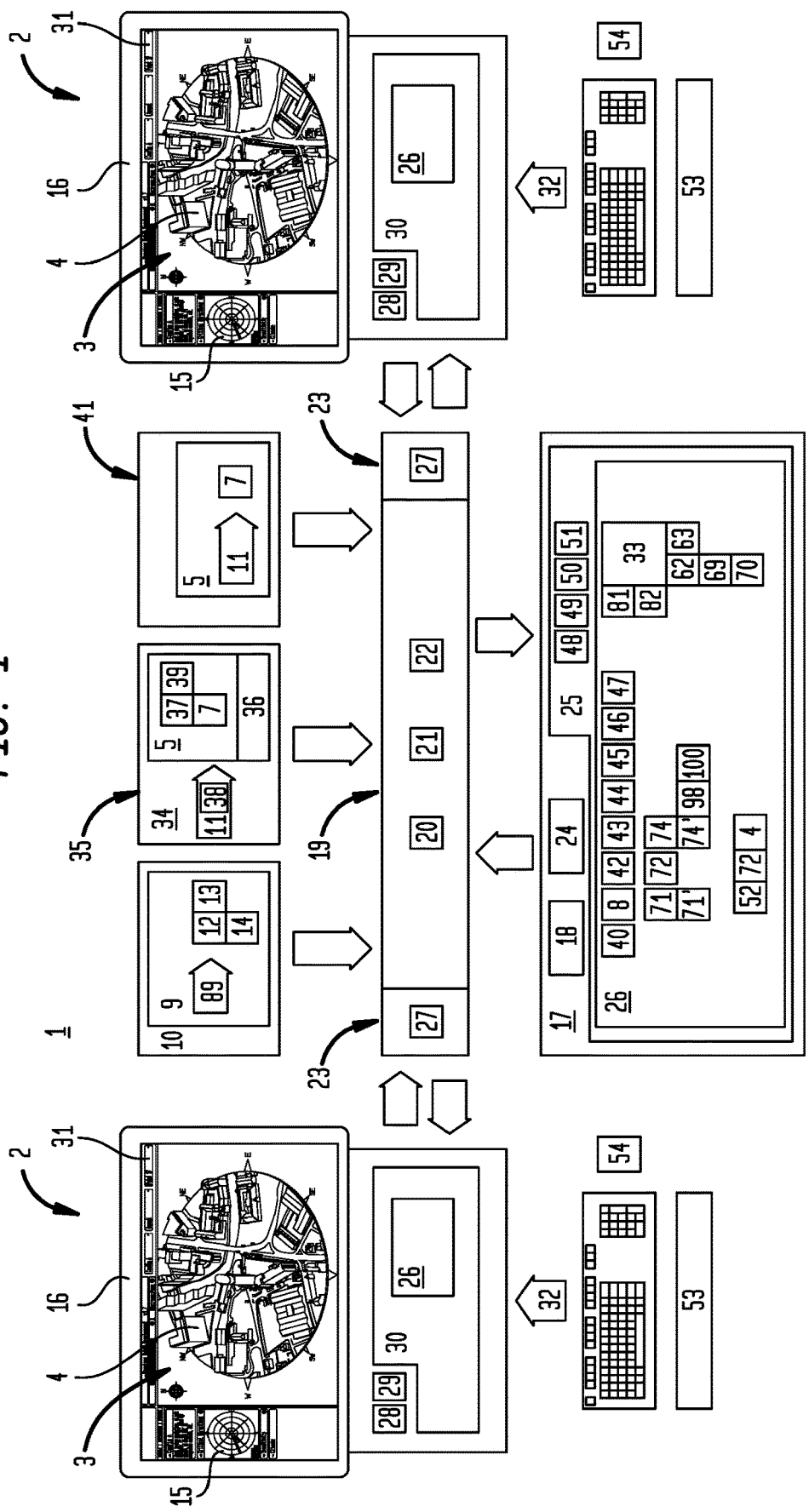
FIG. 1 is a block diagram of a particular embodiment of a pedestrian wind environment analysis and display system.

Generally referring to FIGS. 1 through 7, a computer implemented environmental display system (1) (also referred to as the "system") includes network elements, computer elements and software elements operable to support one or more client computing devices (2) served a graphical user interface (3) including a graphical representation (4) of a spatially referenced three-dimensional model space (5). The graphical representation (4) can included a plurality of graphical indicators (6) each depicted in spatial correspondence to one of a plurality of location coordinates (7) in the spatially referenced three-dimensional model space (5). Each of the plurality of graphical indicators (6)

can be correspondingly associated with computational data pertaining to predicted environmental values (8) generated by simulated interactions with model surfaces in the spatially referenced three-dimensional model space (5) or actual environmental conditions (9) sensed at geographic locations (10) corresponding to the plurality of location coordinates (7) in the spatially referenced three-dimensional model space (5). The predicted environmental values (8) based on fluid flows (11) (actual or computed fluid flow data) at each of the corresponding plurality of location coordinates (7) in the spatially referenced three-dimensional model space (5) can relate to environmental conditions (9) (such as the probable occurrence of wind direction (12), wind speed (13), or temperature (14)) at the geographic locations (10) corresponding to the plurality of location coordinates (7) in the spatially referenced three-dimensional model space (5). Each one of the plurality of graphical indicators (6) in the graphical representation (4) of the spatially referenced three-dimensional model space (5) can be selected to cause depiction of one or more compass graphs (15) on the display surface (16) of the client computing device (2). The one or more compass graphs (15) plot data associated with the selected one of the plurality of graphical indicators (6) pertaining to the predicted environmental values (8) or to the actual environmental conditions (9).

Now referring primarily to FIG. 1, the system (1) can be disposed on one or distributed on a plurality of servers (17) each having a server network interface (18) operably coupled to a plurality of client computing devices (2) by a public network (19), such as the Internet (20), a cellular-based wireless network(s) (21), or a local network (22) (each referred to individually or collectively as the "network"). The network (19) supports a plurality of communication resources (23)(along with other communication resources made available in the future) to afford as illustrative examples: recording, transmission, or reproduction of images (whether still or moving images), sound relating to acoustical, mechanical or electrical frequencies, electronic mail, instant messaging, text messaging (such as short message service) multimedia messaging (such as multimedia message service) each attributable to the execution of self-contained programs or pieces of software designed to fulfill particular purposes, as illustrative examples: web applications, online applications, mobile applications, downloadable from a server (17) or accessible by one or more client computing devices (2).

Figure 2:
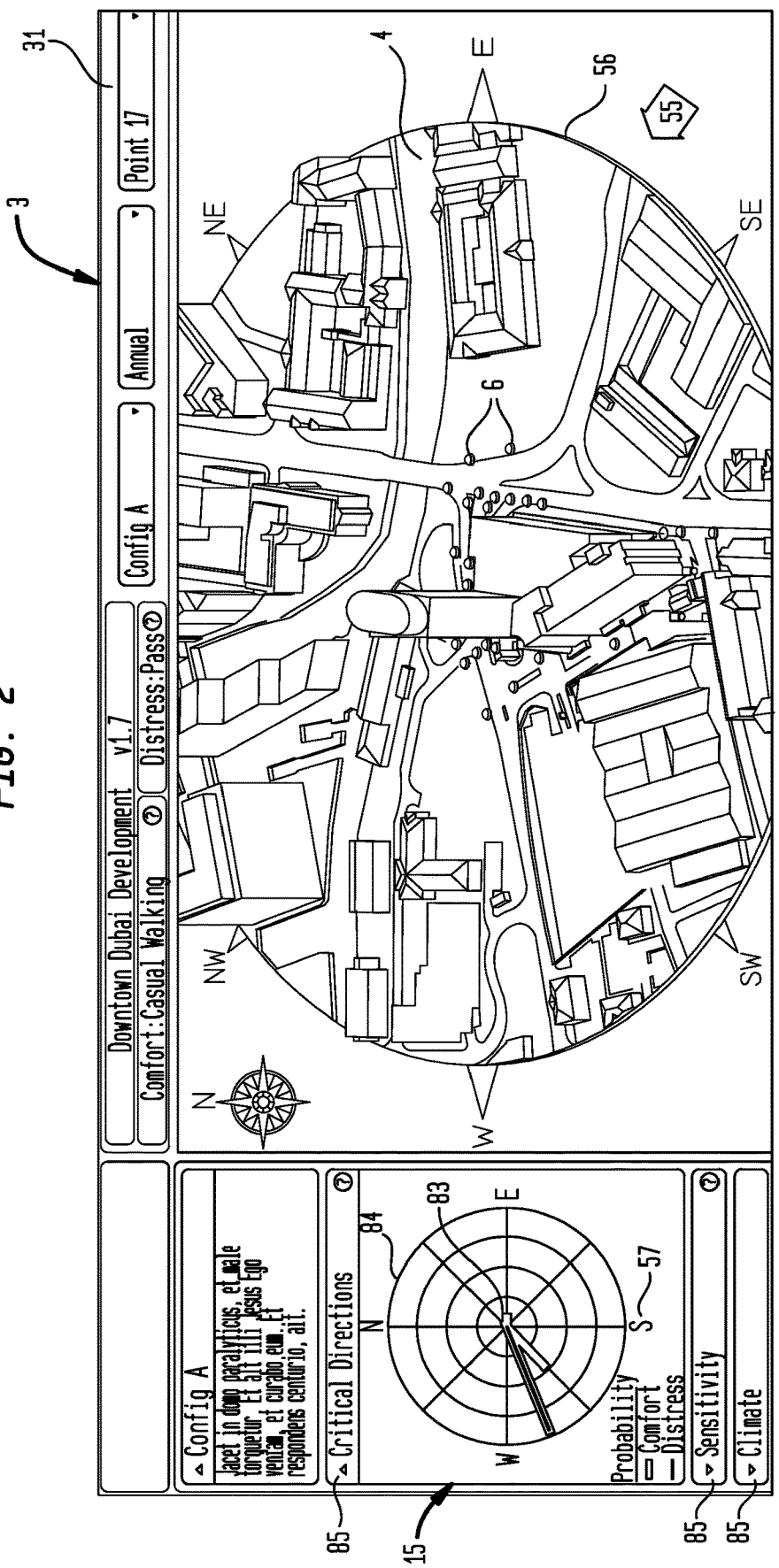
FIG. 2 is illustration of a graphical user interface depicted on the display surface of a computing device including a graphical representation of a spatially referenced three-dimensional model space.

Now referring primarily to FIGS. 1 and 2, the server (17) can include a server processor (24) communicatively coupled to a non-transitory computer readable media (referred to as the "server memory" (25)) containing an environment analysis and display program (26) (also referred to as the "computer program"). The computer program (26) can be accessed, or downloaded in whole or in part, to one or more client computing devices (2) via the network (19) to correspondingly confer user interactive functionalities in and to the client computing device (2) to provide client computing device content (27), as illustrative examples: Internet documents, graphics, audio, and video files, voice communication, electronic mail, instant messages.

In particular embodiments, the computer program (26) can be served and run in a web browser (28) of the client computing device (2) to confer all of the functions and content of the computer program (26) to each of the plurality of client computing device (2). In particular embodiments, the computer program (26) can, but need not necessarily, be downloaded, in whole or in part, from the server (17) to a client computing device (2). The client computing device (2) can include a client device processor (29) communicatively coupled to a non-transitory computer readable media (referred to as the "client device memory (30)"). In particular embodiments, the computer program (26) can, but need not necessarily, be contained on and loaded to a client computing device (2) (or a plurality of client computing devices (2)) from one or more of: a computer disk, universal serial bus flash drive, or other computer readable media.

While embodiments of the computer program (26) are described in the general context of computer-executable instructions such as program modules which utilize routines, programs, objects, components, data structures, or the like, to perform particular functions or tasks or implement particular abstract data types, it is not intended that any embodiments be limited to a particular set of computer-executable instructions or protocols.

Again, referring primarily to FIG. 1, each one of the plurality of client computing devices (2) can include a web browser (28) (also referred to as a "browser"), as illustrative examples: Microsoft's INTERNET EXPLORER®, GOOGLE CHROME®, MOZILLA®, FIREFOX®, which functions to download and render computing device content (27) formatted in "hypertext markup language" (HTML). In this environment, the one or more servers (17) can contain the computer program (26) which implements the most significant portions the graphical user interface(s)(3) including one or more web pages (31) including a combination of text and symbols selectable by user command (32) to execute the functions of the computer program (26). As to these embodiments, the one or more client computing devices (2) can use the web browser (28) to depict downloaded content on the display surface (16) of the client computing device (2) and to relay selected user commands (32) back to the one or more servers (17). The one or more servers (17) can respond by formatting new web pages (31) or downloading additional computing device content (27).

Again, referring primarily to FIG. 1, in other embodiments, the one or more servers (17) can be used primarily as sources of computing device content (27), with primary responsibility for implementing the graphical user interface (3) being placed upon each of the one or more client computing devices (2). As to these embodiments, each of the one or more client computing devices (2) can run the appropriate portions of the computer program (26) implementing the corresponding functions including but not limited to the depiction of the graphical user interface (3).

Again, referring primarily to FIG. 1, a client computing device (2) can include a client device processor (29) communicatively coupled to a client device memory (30) which can, but need not necessarily, contain in whole or in part, the computer program (26), or operate the web browser (28), to implement the functionalities of the client computing device (2) in the system (1) and depict the graphical user interface (3) and by user command (32) implement the functionalities of the computer program (26). The client computing device (2) can as illustrative examples be: a desktop computer device, a mobile computing device, such as, personal computers, slate computers, tablet or pad computers, cellular telephones, smartphones, programmable consumer electronics, or combinations thereof.

Again, referring primarily to FIG. 1, a number of different techniques can be used to generate predictive environment values (8) based on actual or simulated interactions of fluid flows (11) with spatially referenced three-dimensional model spaces (5) (whether computational models or physical models), such as wind or temperature effect in environmental and building design, including as illustrative examples:

wind tunnel, model mockup, nodal/zonal model, or computational fluid dynamics ("CFD"), or combinations thereof. For the purposes of this invention the term "fluid flows" means the interaction or simulated interaction of a fluid in a spatially referenced three-dimensional model space (5). The computational data (33) or predictive environmental values (8) generated by one or more, or combinations, of these techniques can be associated with one more of the plurality of location coordinates (7) in the spatially referenced three-dimensional model space (5) and correspondingly with one or more of the plurality of graphical indicators (6) in the graphical representation (4) of the spatially referenced three-dimensional model space (5) in the graphical user interface (3). While the following illustrative examples describe embodiments of the system (1) practiced with computational data (33) from wind tunnel (35) or computational fluid dynamics (41) technologies, these illustrative examples are not intended to preclude embodiments of the system (1) practiced with computational data (33) obtained from utilizing different techniques capable of generating predictive environment values (8) based on actual or simulated interactions of fluid flows (11) with spatially referenced three-dimensional model spaces (5).

In wind tunnel modeling, the direct environment and the buildings can be modeled on scale to provide a spatially referenced three-dimensional model (5) which can be placed in a test section (34) of a wind tunnel (35). In particular embodiments, the spatially referenced three-dimensional model (5) can be placed on a turntable (36) to allow the spatially referenced three-dimensional model (5) to be oriented in different orientations to the fluid flow (11) in the wind tunnel (35).

As an illustrative example, wind tunnel testing can, but need not necessarily, be conducted in accordance with the standards of the American Society of Civil Engineers ("ASCE") or Structural Engineering Institute ("SEI"). In particular embodiments, wind tunnel testing can be conducted pursuant to Standard ASCE/SEI 49-12, "Wind Tunnel Testing for Buildings and Other Structures," or the specifications of ASCE Manual of Engineering Practice No. 67, "Wind Tunnel Studies of Buildings and Structures" or pursuant to the Environmental Protection Agency's ("EPA's") "Guideline for the Use of Fluid Modeling of the Atmospheric Diffusion", each incorporated by reference herein.

A plurality of sensors (37) suitable to sense one or more fluid flow characteristics (38) such as, speed, acceleration, turbulence, pressure, temperature or other fluid flow characteristics (38), can be located at different location coordinates (7) in the spatially referenced three-dimensional model space (5). Each of the plurality of sensors (37) can generate a fluid flow signal (39) which can vary based on magnitude of the fluid flow characteristics (38). In particular embodiments, the fluid flow signals (39) can be received by a fluid flow processing module (40) of the computer program (26). The fluid flow processing module (40) can be executed to convert the fluid flow signal (39) from analog to digital signals and correspondingly convert the digital signals to predicted environmental values (8) of environmental conditions (9) at geographic locations (10) corresponding to each of the plurality of location coordinates (7) in the spatially referenced three-dimensional model space (5).

As illustrative examples, the predicted environmental values (8) can include one or more of: predicted wind direction values (42), predicted wind speed values (43), predicted wind acceleration values (44), predicted wind pressure values (45), predicted wind temperature values (46), predicted turbulence values (47), or other predicted environmental values (8), or combinations thereof, obtained by processing the duration or amplitude of fluid flow characteristics (38) in the spatially referenced three-dimensional model space (5). Each of the predicted environmental values (8) can be converted to any coherent system of units (such as the International System of Units). For example, predicted wind speed values (43) can be expressed in terms of meters per second ("mps"), or can be converted to Imperial Standard Units in which predicted wind speed values (43) can be expressed in term of miles per hour ("mph").

Computational fluid dynamics (CFD)(41) uses numerical analysis and data structures to solve and analyze problems that involve fluid flows (11). Computers are used to perform calculations to simulate the interaction of fluid flows (11) with surfaces. To generate predicted environmental values (8), computer aided design ("CAD") models (48) of the direct environments and prospective buildings (or of physical three-dimensional models) can be extracted or generated employing computer aided design programs (49). A coordinate system can be assigned to the three-dimensional CAD model (48) to generate a spatially referenced three-dimensional model space (5) in which each point in the model space can be assigned location coordinates (7). Computers perform the calculations to simulate the interaction of fluid flows (11) with surfaces defined by the CAD model (48). In certain embodiments, CFD calculations can be performed to simulate a plurality of wind directions allowing prediction of environmental values (8) pertaining to the geographic locations (10) and in particular for pedestrian wind environment to be assessed by probability evaluation.

In particular embodiments, the fluid flow processing module (40) of the computer program (26) can be executed to convert the simulated fluid flows (11) obtained from CFD (41) to predicted environmental values (8) which can correlate to predicted environmental conditions (9) at geographic locations (10) corresponding to each of the plurality of location coordinates (7) in the spatially referenced three-dimensional model space (5).

The computer program (26) can further include a graphic design conversion module (50) executable to render CAD models (48) generated by the computer aided design program (49) into three-dimensional graphics (51) compatible with web browsers (28) of client computing devices (2).

Now referring generally to FIGS. 1 through 7, the computer program (26) in part includes a graphical user interface module (52) which can be executed to generate a graphical user interface (3) which can be depicted on the display surface (16) of one or more client computing devices (2). A client user (53) by user commands (32) in the graphical user interface (3) can execute one or more functions of the computer program (26). For the purposes of this invention, the term "user command" means action by the client user (53) which activates a function of the computer program (26) which as illustrative examples include operating a pointing device (54) while a pointer (55) is located over an interactive field in the graphical user interface (3) which activates a function of the computer program (26). However, it is not intended that a "user command" be limited to a pointer device (54) and pointer (55), rather, the term "user command" is intended to broadly encompass a command by the client user (53) through which a function of the computer program (26) can be activated or performed, whether through voice command, keyboard stroke, mouse button press, touch, or otherwise.

Now, referring primarily to FIGS. 2 through 7, in particular embodiments, the graphical user interface module

(52) can be executed to depict a graphical representation (4) of the spatially referenced model space (5). For the purposes of this invention, the term "spatially referenced three dimensional model space" means a mathematical representation of a three dimensional model within a coordinate system wherein each point within the three dimensional model can be associated with location coordinates (x,y) or (x, y, z) and by using a collection of points connected by various geometric entities such as lines, planar surfaces, curved surfaces, or the like, the environmental surfaces or building surfaces of the model space can be mathematically represented and converted by the a graphical user interface module (52) into a graphical representations (4) of the spatially referenced three dimensional model space (5) which can be depicted on the display surface (16) of the client computing device (2). In particular embodiments, the graphical representation (4) of said spatially referenced three-dimensional model space (5) can, but need not necessarily, be disposed on a graphical multiple axis positioning table (56) having the cardinal directions (57) separated by 90 degrees. By user command (32), the client user (53) can move the positioning table (56) in one or more axes to view the graphical representation (4) of the spatially referenced model space (5) from a plurality of different directions. While the illustrative example depicts the positioning table (56) as circular, any configuration can be utilized.

Again, referring primarily to FIGS. 2 through 7, in particular embodiments, the graphical user interface module (52) can be executed to depict a plurality of graphical indicators (6) in the graphical representation (4) of the spatially referenced three-dimensional model space (5). Each of the plurality of graphical indicators (6) can positioned in the graphical representation (4) corresponding to location coordinates (7) in the spatially referenced three-dimensional model space (5). Thereby, the position of each of the plurality of graphical indicators (6) the graphical representation (4) can be associated with computational data (33) and predicted environmental values (8) corresponding to the related location coordinates (7) in the spatially referenced three-dimensional model (5).

Figure 5:
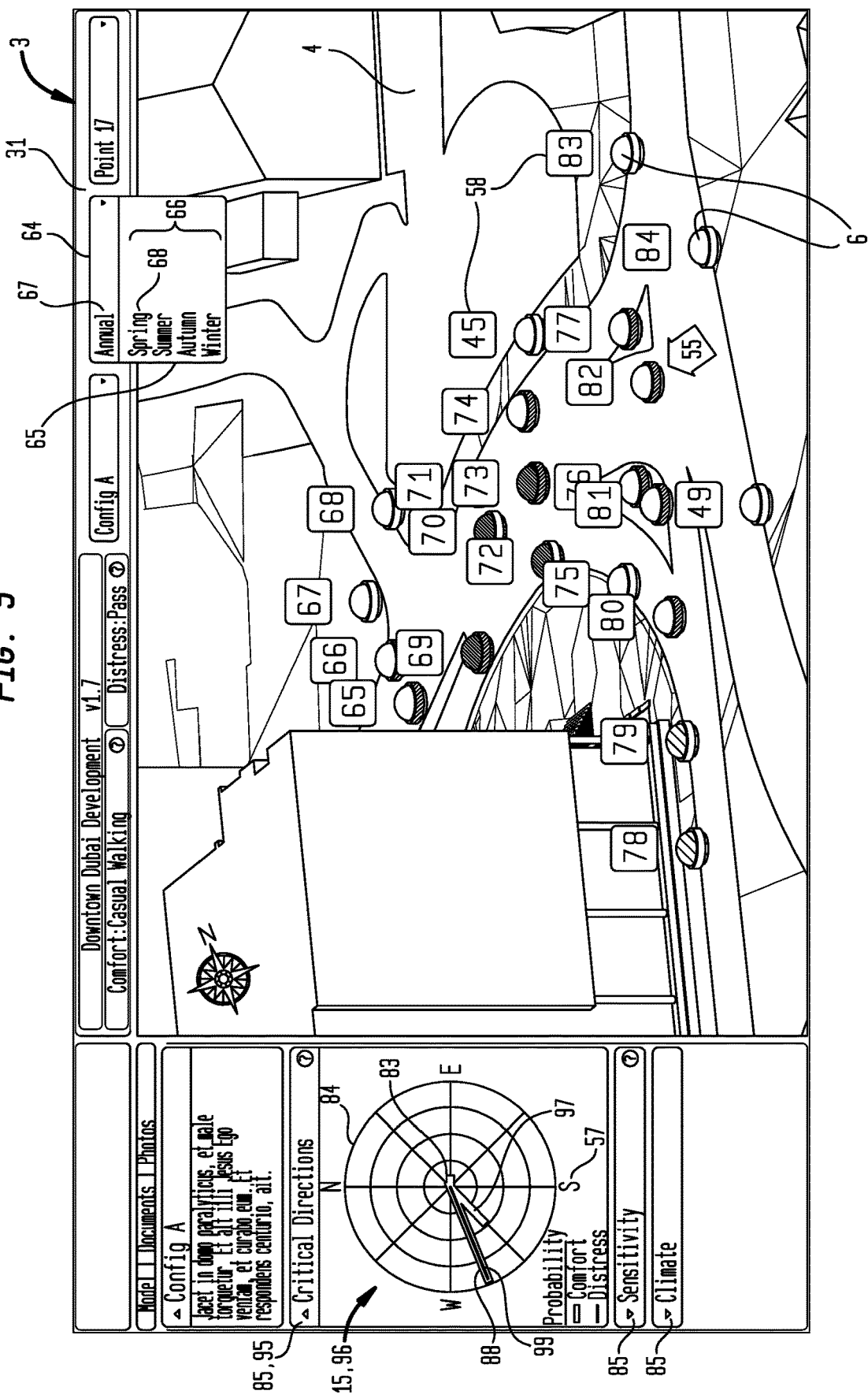
FIG. 5 is illustration of a graphical user interface depicted on the display surface of a computing device including a graphical representation of a spatially referenced three-dimensional model space including a critical directions compass graph.
Figure 6:
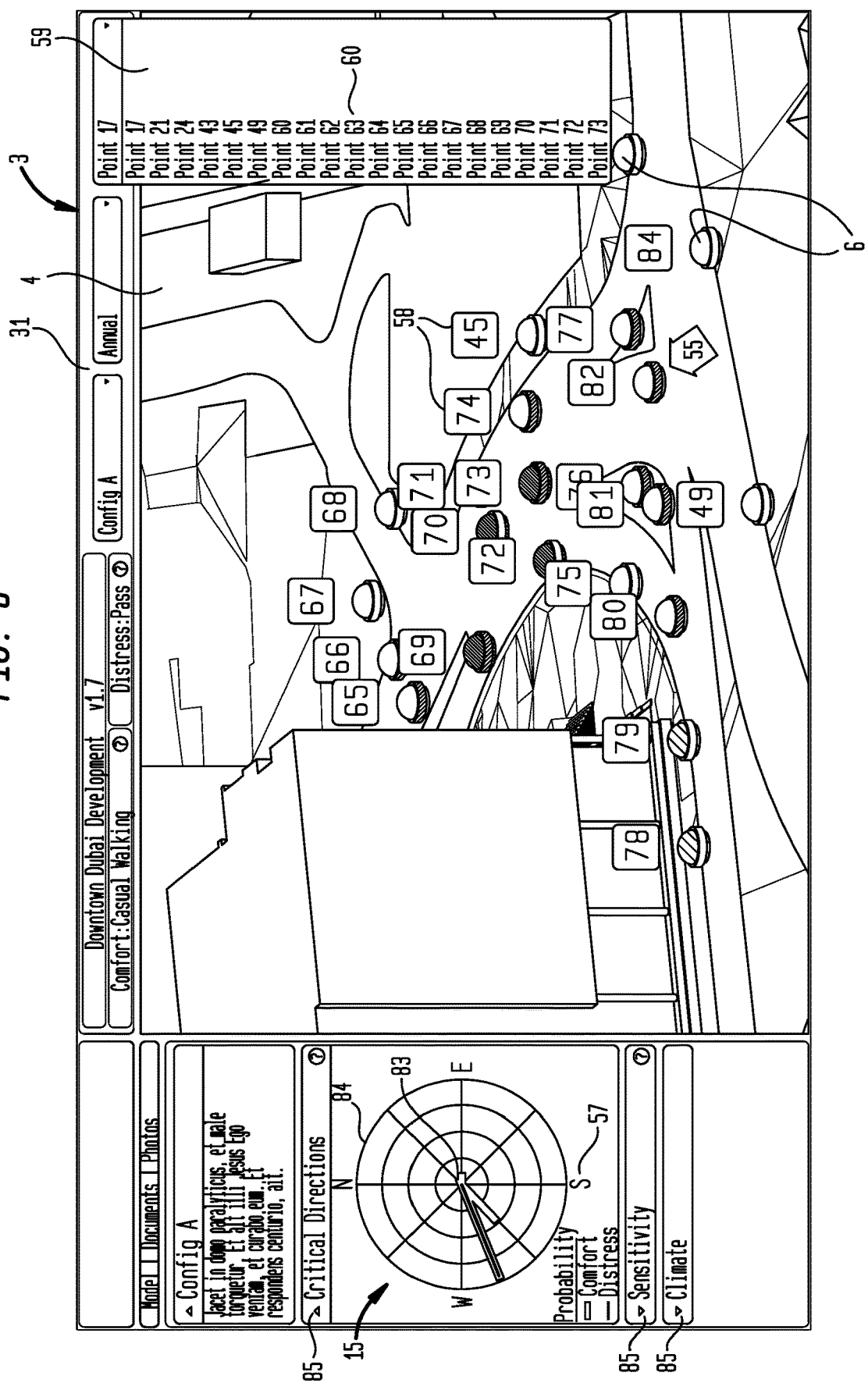
FIG. 6 is an enlargement of a portion of the graphical representation of the spatially referenced three-dimensional model space depicting a plurality of graphical indicators each selectable to retrieve computational data associated with the corresponding location coordinates and plot the computational data into one or more graphs.

Now referring primarily to FIGS. 5 and 6, in particular embodiments, the graphical user interface module (52) can, but need not necessarily, be further executed to associate one of a plurality of reference numerals (58) with each one of the plurality of graphical indicators (6) depicted in the graphical representation (4) of the spatially referenced model space (5). By user command (32), a graphical indicator selection list (59) (shown in the example of FIG. 6 as a drop down list) can be generated which correspondingly includes a plurality of reference numeral identifiers (60) each selectable to corresponding select one of the graphical indicators (6) associated with the matching one of the plurality of reference numerals (58). However, this illustrative embodiment, is not intended to preclude other user commands (32) useful in selection of one of the plurality of graphical indicators (6) in the graphical representation (4) such as use of pointing device (54) and a pointer (55).

Now referring primarily to FIG. 5, in particular embodiments, computational data (63) can be associated with date-time stamps (63) which can be coordinated with the passing of time periods (62) such as calendar years, calendar seasons, calendar days or coordinated with the passing of hours, minutes or seconds within time periods (62). The graphical user interface module (52) can be further executed to depict a time period selector (64) in the graphical user interface (6) which by user command (32) allows selection of a time period (62) which causes the computer program (26) to delimit the computational data (33) and correspondingly predicted environmental values (8) associated with one or more of the plurality graphical indicators (6) to the selected time period (62).

In the embodiment shown in FIG. 5, the graphical user interface module (52) can be executed to depict a time period selection list (65) (shown in the example of FIG. 5 as a drop down list) which correspondingly includes a plurality of time period identifiers (63) each selectable by user command (32) to corresponding delimit the computation data (33) used in generating the environmental values (8) associated with the selected one of the graphical indicators (6). In the illustrative example of FIG. 6, the plurality of time period identifiers (63) include an annual identifier (67) (inclusive of a calendar year) and seasonal identifiers (68) (including "Spring", "Summer", "Autumn" and "Winter" each of which can correspond to a calendar quarter). However, this illustrative embodiment, is not intended to preclude structures for the selection of a time period (62) based on a beginning date-time (69) and an ending date-time (70).

Figure 7:
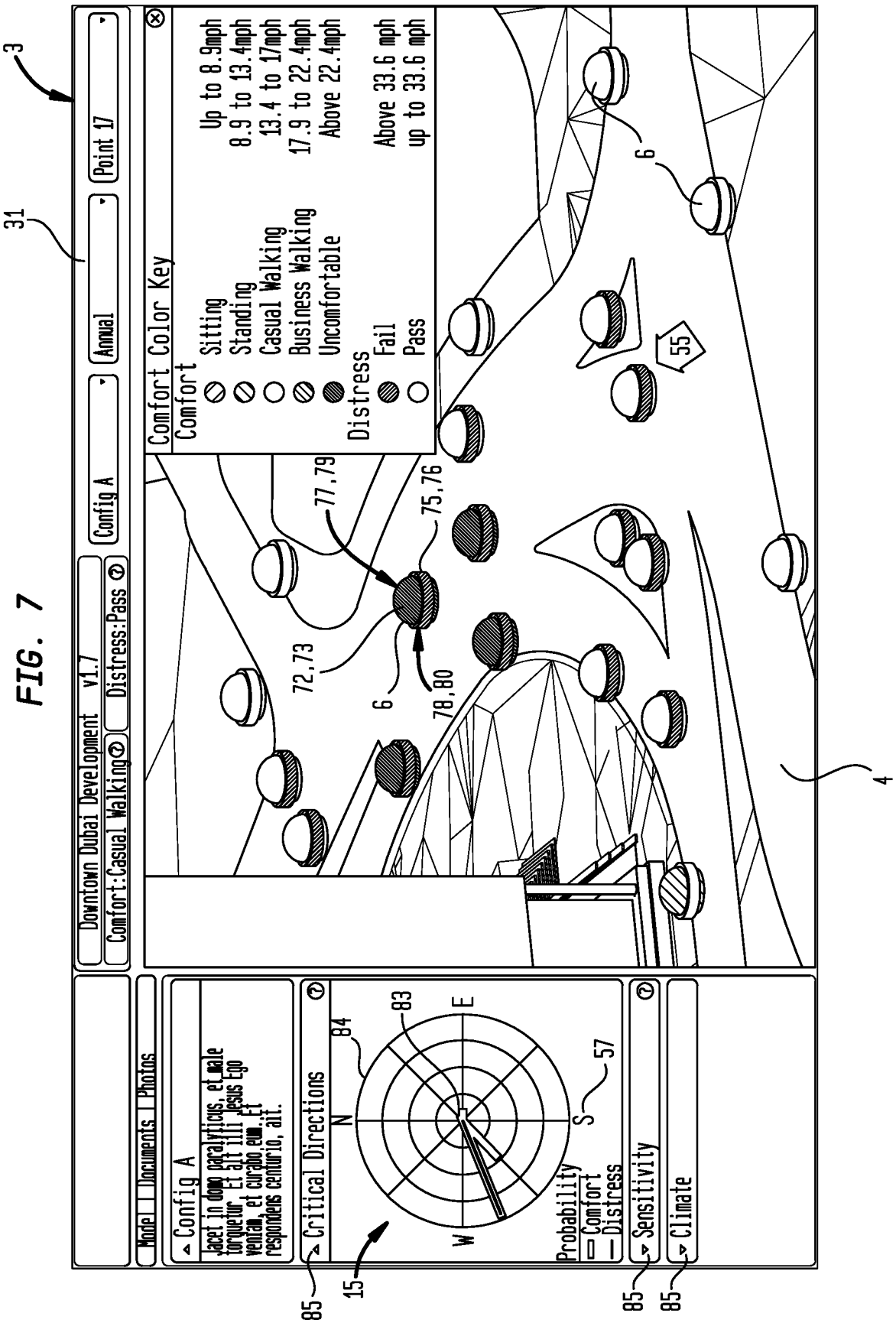
FIG. 7 is an enlargement of one of the plurality of graphical indicators each including a first and second visual indicia each having a variable attribute based on correlation with one or more first wind speed threshold values or one or more second wind threshold variables along with an illustrative key which associates a predicted wind speed with each of the variable attributes of the first visual indicia or the second visual indicia.

Now referring primarily to FIG. 7, in particular embodiments, the computer program (26) can be further executed to compare the predicted environmental values (8) associated with each of the plurality of location coordinates (7) in the spatially referenced three-dimensional model space (5) to a first plurality of environmental threshold values (71), whereby correlation of a predicted environmental value (8) in excess of each one of the first plurality of environmental threshold values (71) correspondingly changes attributes of a first indicia (72) associated with the graphical indicators (6) in the graphical representation (4) of spatially referenced three dimensional model space (5).

Again, referring primarily to FIG. 7, each of the graphical indicators (6) depicted in the graphical representation (4) of the spatially referenced three-dimensional model (5) can, but need not necessarily, further include a first indicia (72) in the form of a graphical indicator color (73) having the variable attribute of indicator color change based on correlation of a predicted environmental value (8) in excess of each one the first plurality environmental threshold values (71). In particular embodiments, a graphical indicator color (73) can color change based upon correlation of a predicted wind speed value (43) in excess of each one of a plurality of wind speed threshold values (71'). While the example of FIG. 7, includes a graphical indicator color (73) which color changes based on correlation of a predicted wind speed value (43) in excess of each one of five first wind speed threshold values (71'), this illustrative example is not intended to preclude embodiments in which the plurality of first environmental threshold values (71) include between one and twenty first environmental threshold values (71) and in the context of the example of FIG. 7 includes at least one first wind speed threshold, at least two wind speed thresholds, at least three first wind speed thresholds, at least four first wind speed thresholds, at least five first wind speed thresholds, at least six first wind speed thresholds, at least seven first wind speed thresholds, at least eight wind speed thresholds, at least nine wind speed thresholds, at least ten wind speed thresholds, at least eleven wind speed thresholds, at least twelve wind speed thresholds, at least thirteen wind speed thresholds, at least fourteen wind speed thresholds, at least fifteen wind speed thresholds, at least sixteen wind speed thresholds, at least seventeen wind speed thresholds, at least eighteen wind speed thresholds, at least nineteen wind speed thresholds, at least twenty wind speed thresholds, or a greater number of first wind speed thresholds, or combinations thereof. While the instant example correlates predicted wind speed values (43) to a plurality of first wind speed thresholds (71'), this is not intended to limit the predicted environmental value (8) solely to predicted wind speed value (43) or to a plurality first wind speed threshold values (71'); rather the predicted environmental value (8) could be any one of predicted wind direction values (42), predicted wind speed values (43), predicted wind acceleration values (44), predicted wind pressure values (45), predicted wind temperature values (46) or predicted wind turbulence (47), or the like, which can be correlated with corresponding plurality of first environmental threshold values (71).

In the particular embodiment of FIG. 7, the plurality of first wind speed thresholds (71') fall within a range of predicted wind speed values (43) of zero miles per hour to about 25 miles per hour; although embodiments can have a greater or lesser range of predicted wind speed values (43) represented by units in any standardized unit system. While embodiments of the first indicia (72) color changes based on correlation of predicted wind speed values (43) in excess of one of the plurality of first wind speed thresholds (71'); this illustrative example is not intended to preclude embodiments in which the variable attribute comprises a difference in one or more of: cross hatch, texture, stipple, luminosity, or other sensorial perceivable differences.

Again, referring primarily to FIG. 7, in particular embodiments, the computer program (26) can be further executed to compare the predicted environmental values (8) associated with each of the plurality of location coordinates (7) in the spatially referenced three-dimensional model space (5) to a plurality of second environmental threshold values (74), whereby correlation of a predicted environmental value (8) in excess of each one of the plurality of second environmental threshold values (74) correspondingly changes attributes of a second indicia (75) associated with the graphical indicators (6) in the graphical representation (4) of spatially referenced three dimensional model space (5).

Again, referring primarily FIG. 7, the graphical user interface module (52) can, but need not necessarily, function to depict the second indicia (75) in association with each graphical indicator (6) which has a variable attribute based upon correlation with a plurality of second environmental threshold values (74). In the illustrative example of FIG. 7, the second indicia (75) comprises band color (76) about a graphical indicator (6) and the variable attribute of a band color (76) change can be correlated with a predicted wind speed (43) in excess of each one or more second wind speed threshold values (74'). In the example of FIG. 7, only one second wind speed threshold value (74') defines a first wind speed range of up to about 30 mph (the example of FIG. 7 depicting up to 33.6 mph") from a second wind speed range of above about 30 mph (the example of FIG. 7 depicting "above 33.6 mph"). While embodiments of the second indicia (75) shown in the Figures varies in band color (76) change based on correlation with a second wind speed threshold (74'); this illustrative example is not intended to preclude embodiments in which the variable attribute comprises a difference in one or more of: cross hatch, texture, stipple, luminosity, or other sensorial perceivable differences.

Now referring primarily to FIGS. 5 through 7, in particular embodiments, the one or more graphical indicators (6) depicted in the graphical representation (4) of the three-dimensional model space (5) can have a first portion (77) and a second portion (78). The first portion (76) can be associated with the first indicia (72) and the second portion (77) can be associated with the second indicia (75). In the illustrative examples shown in the Figures, the first portion (77) comprises a spherical graphical indicator (79) and the second portion (78) comprises a circumferential band (80) disposed about the spherical graphical indicator (79); however, this illustrative example is not intended to preclude embodiments in which the first portion (77) has a different configuration or in which the second portion (78) has a different configuration sensorially distinguishable from the first portion (77).

Now referring primarily to FIGS. 1 through 7, the computer program (26) can further include a probability data set generator (81) which delimits the computational data (33) based on a given or selected combined probability of occurrence (82) as the basis for computation of predicted environmental values (8) associated with location coordinates (7) of each of the plurality graphical indicators (6) depicted in the graphical representation (4) of the spatially referenced model space (5) or with actual environmental conditions (9). As an illustrative example, with respect to computational data (33) providing the basis for predicted wind speed (43), the computational data (33) can be delimited to reflect the relative occurrence of predicted wind speed (43) in each wind direction (12) for a given or selected combined probability of occurrence (82).

Figure 3:
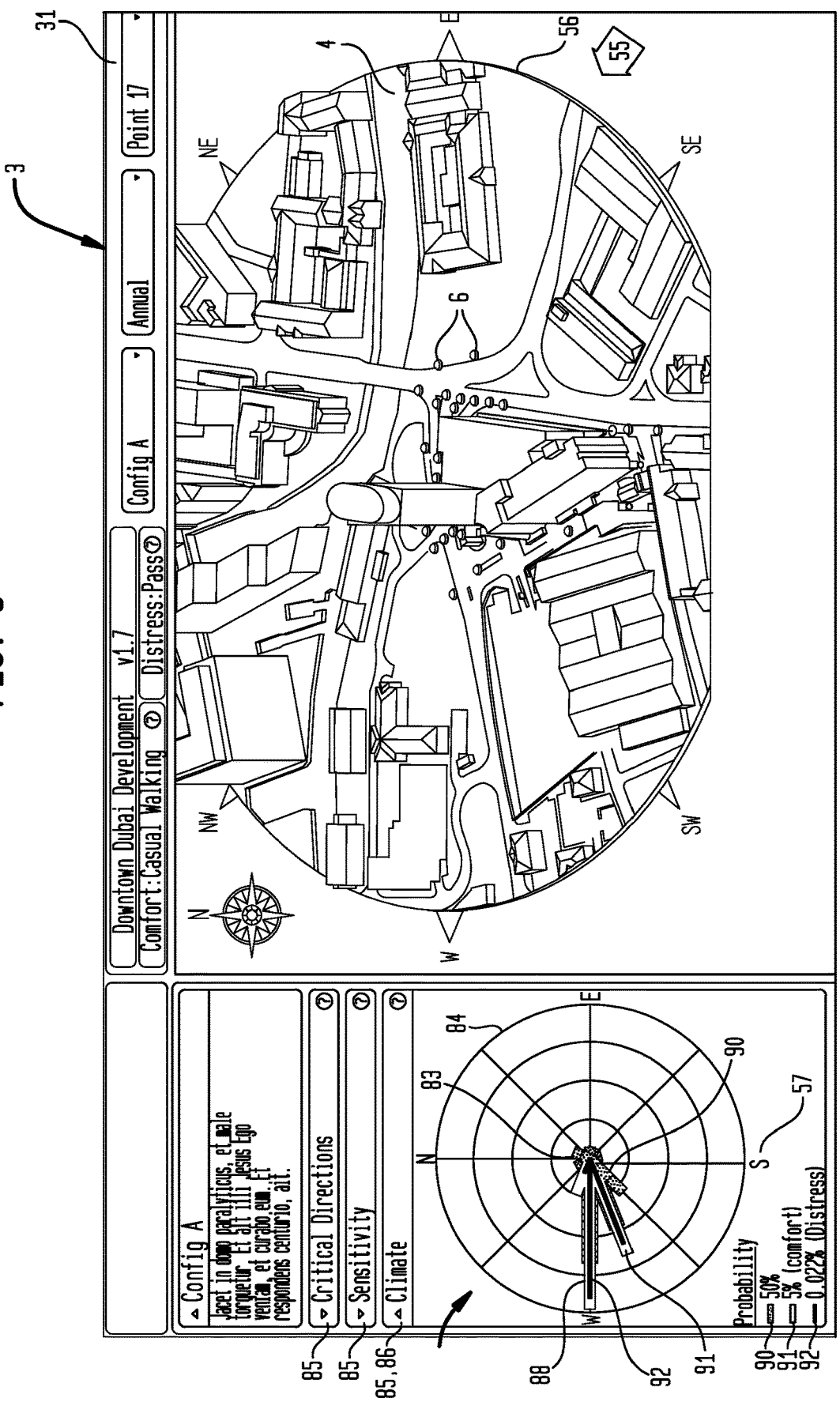
FIG. 3 is illustration of a graphical user interface depicted on the display surface of a computing device including a graphical representation of a spatially referenced three-dimensional model space including a climate compass graph.
Figure 4:
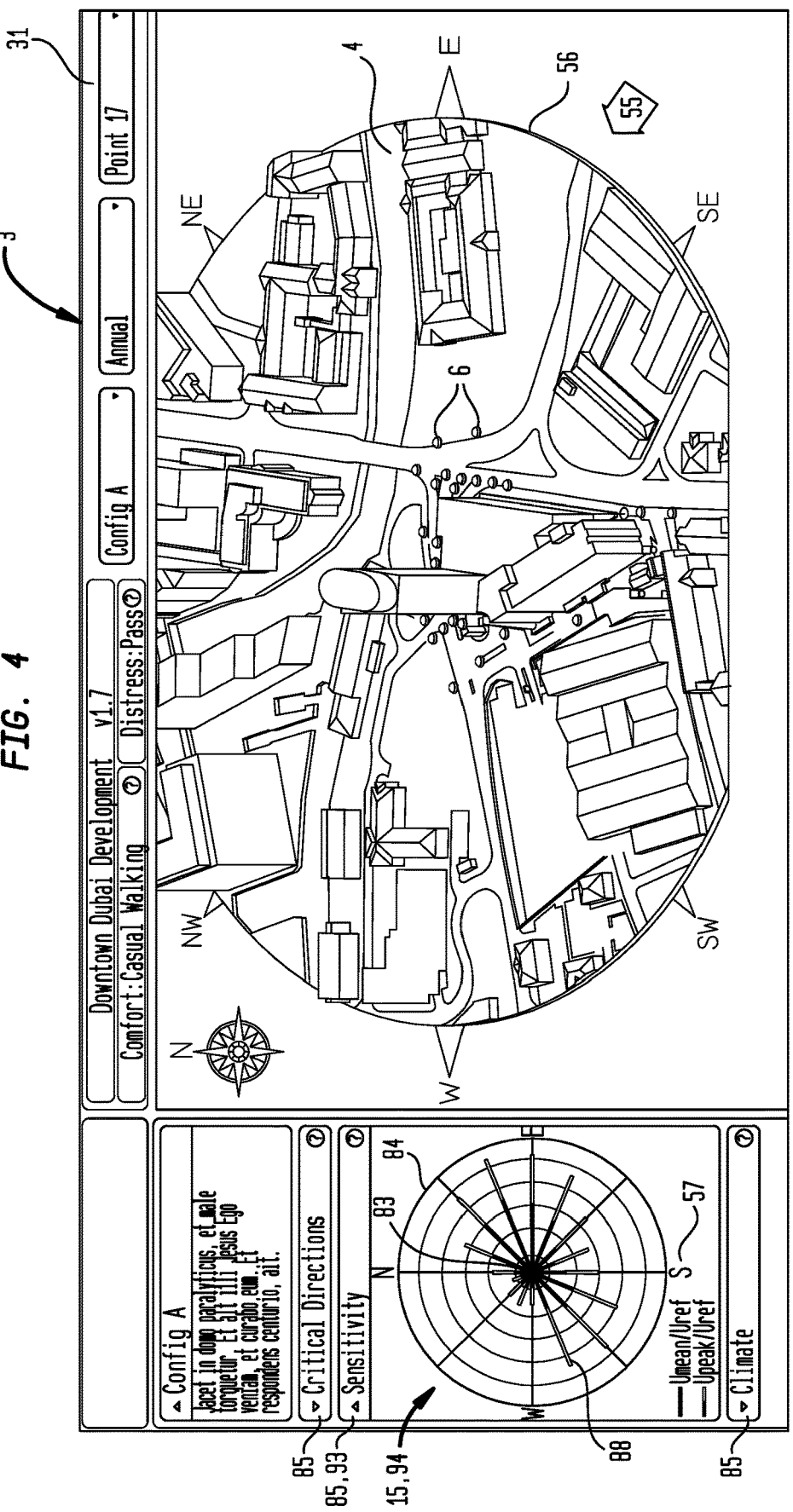
FIG. 4 is illustration of a graphical user interface depicted on the display surface of a computing device including a graphical representation of a spatially referenced three-dimensional model space including a sensitivity compass graph.

Now referring primarily to FIGS. 2 through 4, any one of the plurality of graphical indicators (6) can be selected by user command (32) to cause depiction of various compass graphs (15) on the display surface (16) of the client computing device (2). The depiction of the compass graphs (15) can, but need not necessarily, be depicted on the display surface (16) of the client computing device (2) concurrent with depiction of graphical representation (4) of the spatially referenced model space (5) for concurrent viewing by the client user (53). Each of the compass graphs (15) can having an origin (83) at a center of a circular periphery (84) having cardinal directions (57) separated by 90 degrees at the circular periphery (84). However, the term "compass graph" can be broadly construed as any graph configuration capable of illustrating actual environmental conditions (9) or predicted environmental values (11) against relative probability of occurrence of the actual environmental conditions (9) or environmental value (11) relative to cardinal directions (57).

Now referring primarily to FIG. 3 through 5, a client user (53) by user command (32) can select one of the plurality of graphical indicators (6) in the graphical representation (4) of the spatially referenced three-dimensional model space (5), and client user (53) by user command (32) can further select one of a plurality of compass graphs (15) (shown in the illustrative example of FIG. 4 as selectable graph icons (85) "Critical Directions", "Sensitivity", or "Climate").

Now referring primarily to FIGS. 1 and 3, selection by user command (32) of the "Climate" graph icon (86) causes the computer program (26) to depict the climate compass graph (87) which plots relative occurrence of wind direction (12) measured at the geographic location (10) associated with the location coordinates (7) depicted in the graphical representation (4) of the spatially referenced three-dimensional model space (5) (exclusive of the local topography and buildings), and in particular embodiments, the wind direction (12) associated with the location coordinates (7) of the selected graphical indicator (6) (exclusive of the local topography and buildings) at the corresponding geographic location (10). In the illustrative example of FIG. 3, the climate compass graph (87) plots relative occurrence of wind direction (12) associated with the geographic location (10) as one or more vector indicators (88) extending from the origin (83) toward the circular periphery (84). Each vector indicator (88) indicates wind direction (12) by extending toward the direction of wind flow (89) and indicates relative occurrence of direction of wind flow (89) in each wind direction (12) by extending a distance toward the circular periphery (84) in relative proportion to the sum of the combined probabilities (82) of the plotted occurrences represented by the vector indicator (88).

In the illustrative example of FIG. 3, the climate compass graph (87) depicts the relative occurrence of wind flow (89) from each wind direction (12) based on one or more given or selected combined probabilities (the sum of the individual probabilities of wind flow (89) occurring in each wind direction (12) equal to the given or selected combined probability). In particular embodiments, a first wind direction plot (90) of wind direction (12) can be based on given or selected combined probability (82) of fifty percent (50%) (shown in the example of FIG. 3 with vector indicators (88) depicted with a stipple fill), a second wind direction plot (91) of wind direction (12) can be based on a given or selected combined probability (82) of five percent (5%) (shown in the example of FIG. 4 with vector indictors (88) depicted without any fill), and a third wind direction plot (92) of wind direction (12) can be based on a given or selected combined probability of 0.022 percent (shown in the example of FIG. 4 with vector indicators depicted with a solid fill). In these illustrative examples, the sum of the probabilities of all the vector indicators (88) in the first, second, or third plot (or additional plots) equals the selected or given probability by which the computational data for wind direction (12) was delimited (in the illustrative example corresponding to 50%, 5%, or 0.022% respectively). While the illustrative example of FIG. 4, includes plots of wind direction based on a given or selected combined probability of 50%, 5%, or 0.022% respectively, this is not intended to limit the number of plots or the respective given or selected combined probabilities to any particular number.

Now referring primarily to FIG. 4, selection by user command (32) of the "Sensitivity" graph icon (93) causes the computer program (26) to depict the sensitivity compass graph (94) which plots relative predicted wind speed values (43) against direction of wind flow (89) at the location coordinates (7) associated with a selected one of the plurality of graphical indicators (6) in the graphical representation (4) of the spatially referenced three-dimensional model plot (5) (inclusive of the local topography and buildings included in the three dimensional model). Each vector indicator (88) indicates measured wind speed values (43) by extending toward the circular periphery (84) in the direction from which the wind flows and in relative proportion to magnitude of the measured wind speed values (43).

Now referring primarily to FIG. 5, selection by user command (32) of the "Critical Directions" graph icon (95) causes the computer program (26) to depict the critical conditions compass graph (96). The critical conditions graph (96) plots relative predicted wind direction values (42) at the location coordinates (7) in the spatially referenced three-dimensional model space (inclusive of the local topography and buildings) associated with a selected one of the plurality of graphical indicators (6) in the graphical representation (4) of the spatially referenced three-dimensional model plot (5). Each vector indicator (88) indicates predicted wind direction values (42) by extending toward the direction of wind flow (89) and indicates relative occurrence of predicted wind direction values (42) by extending a distance toward the circular periphery (84) in relative proportion to the sum of the combined probabilities (82) of the plotted occurrences represented by the vector indicators (88).

In the illustrative example of FIG. 5, the critical conditions graph (96) depicts the relative occurrence of predicted wind direction values (42) based on a given or selected combined probability (82). As an illustrative example, a first wind direction plot (97) of the predicted wind direction values (42) can be based on a given or selected combined probability (82) of five percent (5%) which indicate the relative occurrence of predicted wind direction values (42) corresponding to a first wind speed range (98) (shown in the example of FIG. 5 with vector indictors (88) depicted in stippled fill and keyed to "comfort"), and a second wind direction plot (99) ((of the predicted wind direction values (42) corresponding to a second wind speed range (100) (show in the example of FIG. 5 with vector indicators (88) depicted in solid fill and keyed to "distress"). The first and second wind speed ranges (98)(100) defined by predicted wind speed values (42) occurring below or in excess of the second wind speed threshold value (74'), as above described.

Accordingly, for any one of the graphical indicators (6) in the graphical representation (4) of the spatially referenced three-dimensional model (5) selected by user command (32), the critical conditions graph (96) can depict in one or more plots of predicted wind direction (12) for the predicted wind speed values (42) and depict the predicted wind speed range (whether in a first wind speed range (98) associated with "comfort" or a second wind speed range (100) associated with "distress."

As can be easily understood from the foregoing, the basic concepts of the present invention may be embodied in a variety of ways. The invention involves numerous and varied embodiments of an environment display system and methods for making and using such pedestrian wind environment analysis and display system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "indicator" should be understood to encompass disclosure of the act of "indicating"—whether explicitly discussed or not—and, conversely, were there effectively disclosure of the act of "indicating", such a disclosure should be understood to encompass disclosure of an "indicator" or even a "means for indicating." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the pedestrian wind environment analysis and display system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A computer, comprising:
a processor communicatively coupled to a non-transitory computer readable media containing a computer program executable to:
convert fluid flow data generated by each of a plurality of physical sensors correspondingly disposed at each of a plurality of location coordinates in a spatially referenced three-dimensional physical model disposed in a wind tunnel generating a fluid flow over said three-dimensional physical model to simulate wind flow from a plurality of wind flow directions to correspondingly predict wind speed values from each of said plurality of wind flow directions at corresponding geographic locations in a pedestrian wind environment;
render a graphical representation of said spatially referenced three-dimensional physical model;
depict one of a plurality of graphical indicators in said graphical representation of said three-dimensional model space at each of said plurality of location coordinates corresponding to a physical sensor in said spatially referenced physical model; and
correspondingly associate said predicted wind speed values associated with each of said plurality of location coordinates corresponding to the physical sensor in said three-dimensional physical model with each of said plurality graphical indicators located in said graphical representation of said three-dimensional physical model,
depict said plurality graphical indicators of the physical sensor having a first indicator portion and second indicator portion, said first indicator portion associated with a first indicia and said second indicator portion associated with a second indicia, wherein said first indicator portion comprises a spherical indicator portion and wherein said second indicator portion comprises a circumferential indicator band disposed about said spherical indicator portion, wherein said first indicia and said second indicia depict correlation of said predicted wind speed values at each of said plurality of location of the physical sensor to a plurality of wind speed ranges defined by a plurality of wind threshold values.

2. The computer of claim 1, wherein said computer program is further executable to associate said first indicia with each one of said plurality of graphical indicators, said first indicia having a first variable attribute based upon correlation of said predicted wind speed values to a first plurality of wind speed ranges defined by a first plurality of wind speed value thresholds.

3. The computer of claim 2, wherein said first plurality of wind speed threshold values comprise between two wind speed threshold values to twenty wind speed threshold values.

4. The computer of claim 3, wherein said first variable attribute of said first indicia comprises a plurality of different colors correlated with one of said plurality of wind speed ranges defined by said first plurality of wind speed threshold values.

5. The computer of claim 2, wherein said computer program is further executable to associate said second indicia with each one of said plurality of graphical indicators, said second indicia having a second variable attribute based upon correlation of said predicted wind speed values to a second plurality of wind speed ranges defined by a second plurality of wind speed value thresholds.

6. The computer of claim 5, wherein said second variable attribute of said second indicia comprises a plurality of different colors correlated with said one of said second plurality of wind speed ranges defined by said second plurality of wind speed threshold values.

7. The computer of claim 1, wherein said computer program is further executable to determine relative occurrence of said predicted wind speed values from a plurality of wind flow directions.

8. The computer of claim 7, wherein said computer program is further executable to determine relative occurrence of said predicted windspeed values from each of said plurality of wind flow directions delimited by a selected combined probability of occurrence from all of said plurality of wind flow directions.

9. The computer of claim 7, wherein said plurality of graphical indicators depicted in said graphical representation of said spatially referenced three-dimensional physical model comprise a plurality of selectable graphical indicators, wherein selection of one of said plurality of selectable graphical indicators causes concurrent generation of a graph in said graphical user interface, wherein said graph includes a plot of relative occurrence of said predicted wind speed values from said plurality of wind flow directions associated with said graphical indicator.

10. The computer of claim 8, wherein said plurality of graphical indicators depicted in said graphical representation of said spatially referenced three-dimensional physical model comprise a plurality of selectable graphical indicators, wherein selection of one of said plurality of selectable graphical indicators causes concurrent generation of a graph in said graphical user interface, wherein said graph includes a plot of relative occurrence of said predicted wind speed values from said plurality of wind flow directions associated with said graphical indicator delimited by said selected combined probability of occurrence from all of said plurality of wind flow directions.

11. The computer of claim 9, wherein said one or more graphs comprise one or more compass graphs having an origin at a center of a circular periphery having cardinal directions separated by 90 degrees, wherein one or more vector indicators extend from said origin a distance toward said circular periphery based on relative occurrence of said predicted wind speed values from each of plurality of wind flow directions.

12. The computer of claim 10, wherein said one or more graphs comprise one or more compass graphs having an origin at a center of a circular periphery having cardinal directions separated by 90 degrees, wherein one or more vector indicators extend from said origin a distance toward said circular periphery based on relative occurrence of said predicted wind speed values from each of said plurality of wind flow directions delimited by said selected combined probability of occurrence from all of said plurality of wind flow directions.

13. The computer of claim 1, wherein said computer program is further executable to delimit said predicted wind speed values to a selectable time period.

14. The computer of claim 13, wherein said selectable time period is selected from the group consisting of: an annual time period, a seasonal time period, a beginning date to an ending date period, a beginning date-time to an ending date-time period.

15. The computer of claim 1, further comprising a server which functions to serve said graphical user interface upon request from said one or more client computing devices communicatively coupled to said server through a network.

* * * * *